United States Patent [19]

Thrower et al.

[11] 4,292,084

[45] Sep. 29, 1981

[54] VIBRATABLE PLASTIC REFRACTORY

[75] Inventors: Stephen W. Thrower; George H. Criss, both of Bethel Park; Thomas R. Kleeb, Pittsburgh, all of Pa.

[73] Assignee: Dresser Industries, Inc., Dallas, Tex.

[21] Appl. No.: 142,509

[22] Filed: Apr. 21, 1980

Related U.S. Application Data

[63] Continuation-in-part of Ser. No. 922,627, Jul. 7, 1978, abandoned.

[51] Int. Cl.³ .................... C04B 35/10; C04B 35/18; C04B 35/48
[52] U.S. Cl. .................................. 501/107; 501/127; 501/131
[58] Field of Search .................... 106/57, 65, 67, 85

[56] References Cited

U.S. PATENT DOCUMENTS 4,056,398  1/1977  Rechter ............................... 106/85

*Primary Examiner*—James Poer
*Attorney, Agent, or Firm*—J. N. Hazelwood; R. T. Majesko

[57] ABSTRACT

A vibratable plastic refractory composition which is based upon calcined kaolin and a non-basic calcined refractory aggregate, in which the −325 mesh fraction of the batch is controlled to between about 30 and 45%.

8 Claims, No Drawings

VIBRATABLE PLASTIC REFRACTORY

PREVIOUS APPLICATIONS

This application is a continuation-in-part of U.S. Ser. No. 922,627 filed July 7, 1978, now abandoned.

FIELD OF THE INVENTION

Refractory articles for use in metallurgical vessels.

BACKGROUND OF THE INVENTION

In the casting of refractory shapes from finely divided refractory materials, it is a general practice to mix the refractory material with a binder and a suitable amount of a tempering agent, such as, water. The tempering agent is necessary so that the mixture will readily flow into the mold and to enable formability of the mixture. After the shape has been molded, it is usually fired at an elevated temperature to drive off the tempering agent and other volatiles, thus resulting in a relatively porous product. In many applications, high density refractory shapes are required; thus, reduction of the amount of tempering agent necessary for the mixture, would be extremely helpful in increasing the density of the final product.

Another problem that has arisen in the casting of refractory shapes, is the difficulty of removal of the shape from the mold cavity. Quite often, the green refractory shape has a tendency of adhering to the mold walls, thus, destroying the shape contours upon removal.

In the instant invention, the mix or the molds must be vibrated to achieve maximum density. The invention of vibration forming over conventional casting are numerous. Since the present invention can be supplied as a tempered mix, water amounts, types and temperature as well as mixing parameters are of no concern to the user. The present invention contains no cement; and so, pot life is no problem. Another difference between the present invention and conventional castables, is that castables must be allowed to achieve a set before the forms are removed. With vibration casting, the forms may be removed as soon as the vibration is stopped. The mixes of the present invention will not only support their own weight, but will support a considerable additional load without slumping.

U.S. Pat. No. 4,056,398 relates to a plastic refractory composition suitable for placement by vibrating techniques. The composition is based upon a carefully controlled addition of bentonite and tetrasodium pyrophosphate in combination with one or more aluminous materials.

OBJECTS OF THE INVENTION

Accordingly, it is an object of the present invention to provide a refractory plastic composition that is thixotropic, both as made and after extended storage.

It is another object of the invention to provide a vibratable plastic refractory which will remain workable after extended storage.

Still another object of the invention is to provide a vibratable plastic refractory composition which does not require the use of a crude or raw refractory clay.

SUMMARY OF THE INVENTION

In accordance with the present invention, there is provided a vibratable plastic refractory composition. The composition comprises about 2 to 40%, by weight, of a calcined kaolin. The balance of the composition is a nonbasic calcined refractory aggregate. The composition must have a $-325$ mesh fraction between about 30 and 45%.

DETAILED DESCRIPTION OF THE INVENTION

The composition is formed into shapes or into a refractory lining at its situs of use by feeding the batch to an enclosed area, then applying mechanical vibrations to the batch. In making shapes, the form and batch ingredients may be placed on a vibrating table. At the situs of use, immersible vibrators may be used, or the forms may be vibrated using an attached vibrator.

The calcined refractory aggregate is selected on the basis of the application and service requirements. It is not in and of itself, important to the present invention, although it is preferred that the aggregate is at least one material selected from the group consisting of calcined bauxite, tabular alumina, calcined alumina, calcined fireclay, crushed refractory brick bats, zircon and mullite.

The key ingredient is the calcined kaolin which makes the batch thixotropic, and imparts the vibratable characteristics. At a given phosphoric acid content, the higher amount of calcined kaolin, the longer it must be vibrated. The lesser the amount of calcined kaolin, the purer the bond. The other key to the success of the mix is the proper range of $-325$ mesh fraction. This fraction is most conveniently provided by calcined alumina since is the size in which it is commercially available. However, any of the non-basic ingredients can be utilized to supply all or a portion of this fraction as desired.

In one embodiment, the composition may contain from about 45 to 85% calcined bauxite and from about 15 to 35% calcined alumina. In a preferred embodiment, the composition contains from about 3 to 17% of calcined kaolin with the optimum amount being 3 to 10%.

It is desired that the composition consist only of calcined refractory materials. However, up to 5% of crude kyanite or equivalent material, can be added if desired for imparting shrinkage properties to fired refractory shapes.

It is also preferred that the refractory batch be mixed with concentrated phosphoric acid in an amount to provide $P_2O_5$ equivalent to that provided by about 2 to 17% phosphoric acid of 85% concentration. Water may also be present in the batch, with the amount being dependent upon the amount of phosphoric acid and the particle sizing of the batch. A useful quantity of 85% phosphoric acid appears to be about from 4 to 6% with the water ranging from about 6 to about 9%.

A composition that may be readily fabricated comprises about 60 to 75% of calcined bauxite, about 15 to 25% calcined alumina, up to 5% of kyanite, about 3 to 10% calcined kaolin and about 4 to 6% phosphoric acid.

The following are exemplary of the present invention.

EXAMPLE 1

A number of mixes were composed of calcined bauxite, calcined alumina, crude kyanite and calcined kaolin with phosphoric acid and water additions. Three $9''\times2''\times2''$ bars were vibration cast and tested for bulk density and modulus of rupture, and the remainder of the mix was stored for 90 days. In mixes 1, 2 and 3, −325 mesh grain contents of from 30 to 38%, were studied. It was found that as the amount of −325 mesh grain increased, the water required for tempering increased. The results are shown in Table I below.

TABLE I

| Mix Designation: | 1 | 2 | 3 | 4 | 5 | 6 |
|---|---|---|---|---|---|---|
| Mix: | | | | | | |
| Calcined Bauxite | 68% | 68% | 68% | 63% | 73% | 63% |
| Calcined Alumina | 20 | 20 | 20 | 25 | 15 | 25 |
| Crude Kyanite | | | | 5 | | |
| Calcined Kaolin | | | | 7 | | |
| Plus Additions: | | | | | | |
| Phosphoric Acid, 85% grade | | | | 5.5% | | |
| Water | 6.4% | 6.6% | 6.7% | 7.1% | 6.9% | 7.0% |
| Total − 325 mesh grain | 30 | 34 | 38 | 39 | 28 | 35 |
| Diameter of 2" Cylinder Weighing 300 grams After Vibrating 45 sec | | | | | | |
| As Made: | 3.20" | 3.87" | 3.75" | 3.95" | 3.37" | 3.85" |
| After 1 week: | 2.80 | 3.32 | 3.23 | 3.35 | 3.50 | 3.36 |
| After 30 days: | 2.68 | 2.77 | 2.52 | 2.69 | 2.90 | 3.05 |
| After 60 days: | 2.33 | 2.03 | 2.02 | 2.26 | 2.85 | 2.65 |
| After 90 days: | 2.19 | 2.00 | 2.00 | 2.30 | 2.90 | 2.75 |
| Bulk Density, pcf (Av. 3): | 154 | 156 | 151 | 149 | 147 | 152 |
| Modulus of Rupture, psi (Av. 3): | 154 | 156 | 151 | 149 | 147 | 152 |
| Modulus of Rupture, psi (Av. 3): | 930 | 730 | 740 | 800 | 710 | 910 |

EXAMPLE 2

A number of mixes, shown in Table II below, were prepared and tested. The total −325 mesh grain content ranged from 28 to 48% in mixes 7 through 15. These mixes were tempered with 7.5% to 8.4% water in 0.3% increments. At each water level, the as made vibratability decreased somewhat, as measured by the 300 gram vibration test, and the shelf life deteriorated somewhat as the −325 mesh grain increased. Each mix was vibration cast into an 8"×4"×4" column. As soon as the mix knitted, the vibration was stopped, the mold sides were removed and the column was observed for slumping. Mixes 12 and 13, which were tempered with 8.1% water, were the only mixes which slumped. Mix 14, which was also tempered with 8.1% water, but contained 46% −325 mesh grain, showed no signs of slumping. Mix 15, which was identical to mix 14, except that it was tempered with 0.3% more water, did not slump.

It is intended that the foregoing description be construed as illustrative and not in limitation of the invention.

The embodiments of the invention in which an exclusive property or privilege is claimed are defined as follows:

1. A vibratable plastic refractory composition consisting essentially of about 2 to 40%, by weight, calcined kaolin and the balance at least one non-basic calcined refractory aggregate selected from the group consisting of calcined bauxite, tabular alumina, calcined alumina, calcined fireclay, crushed refractory brick bats, zircon and mullite, said composition containing $P_2O_5$ in an amount equivalent to that provided by about 2 to 17% phosphoric acid of 85% concentration, the composition having a −325 mesh fraction between about 30 and 45%.

2. Composition according to claim 1 which contains by weight, from about 45 to 85% calcined bauxite and from about 15 to 35% calcined alumina.

3. Composition according to claim 1, which contains from about 3 to 17% of calcined kaolin.

4. Composition according to claim 1, which contains from about 3 to 10% of calcined kaolin.

5. Composition according to claim 1, which contains in addition, 0 to about 5% crude kyanite.

6. Composition according to claim 1, which contains in addition, tempering water.

7. Composition according to claim 1, which contains by weight, about 60 to 75% of calcined bauxite, about 15 to 25% of calcined alumina, 0 to 5% kyanite, about 3 to 10% calcined kaolin and about 4 to 6% phosphoric acid of 85% concentration.

8. A method for shaping a refractory comprising forming a batch composition consisting essentially of about 2 to 40%, by weight, calcined kaolin and the balance at least one non-basic calcined refractory aggregate selected from the group consisting of calcined bauxite, tabular alumina, calcined alumina, calcined fireclay, crushed refractory brick bats, zircon and mullite, mixing the batch with $P_2O_5$ in an amount equivalent to that provided by about 2 to 17% phosphoric acid of 85% concentration, the batch having a −325 mesh fraction between about 30 and 45%, feeding the batch to an enclosed area, and applying mechanical vibrations to the batch.

* * * * *

TABLE II

| Mix Designation: | 7 | 8 | 9 | 10 | 11 | 12 | 13 | 14 | 15 |
|---|---|---|---|---|---|---|---|---|---|
| Mix: | | | | | | | | | |
| Calcined Bauxite | | | | | 68% | | | | |
| Calcined Alumina | | | | | 20% | | | | |
| Crude Kyanite | | | | | 5% | | | | |
| Calcined Kaolin | | | | | 7% | | | | |
| Plus Additions | | | | | | | | | |
| Phosphoric Acid 85% Grade | | | | | 5.5% | | | | |
| Water | | 7.5% | | 7.8% | | 8.1% | | | 8.4% |
| Total − 325 Mesh Grain | 31% | 39% | 28% | 37% | 44% | 31% | 39% | 46% | 48% |
| Diameter of 2" Cylinder Weighing 300 grams after Vibrating | | | | | | | | | |
| 45 Seconds as made: | 2.99" | 2.83" | 3.26" | 3.17" | 2.70" | 3.51" | 3.58" | 3.47" | 2.78 |
| After 1 week: | 2.48 | 2.02 | 2.91 | 2.72 | 2.01 | 3.01 | 3.12 | 2.91 | 3.37 |
| After 30 days: | 2.18 | 2.01 | 2.54 | 2.01 | 2.00 | 2.84 | 2.84 | 2.00 | 2.66 |
| After 60 days: | 2.29 | 2.00 | 2.79 | 2.00 | — | 2.92 | 2.75 | — | 2.44 |
| After 90 days: | 2.24 | — | 2.34 | — | — | 2.90 | 2.48 | — | 2.15 |
| Slumping, as made: | None | None | None | None | None | Slight | Very Slight | None | None |